J. M. & H. C. Hill,
Wind Wheel.
No. 92,311. Patented Jul. 6, 1869.

Witnesses
J. P. Evans
D. D. Kane

Inventors
J. M. Hill &
H. C. Hill
Chipman Hosmer
attys

UNITED STATES PATENT OFFICE.

JAMES M. HILL AND HENRY C. HILL, OF FAIRFIELD, ILLINOIS.

IMPROVEMENT IN WINDMILLS.

Specification forming part of Letters Patent No. 92,311, dated July 6, 1869.

*To all whom it may concern:*

Be it known that we, JAMES M. and HENRY C. HILL, of Fairfield, in the county of Wayne and State of Illinois, have invented a new and valuable Improvement in a Perpendicular Self-Governing Wind-Power; and we do hereby declare that the following is a full, clear, and exact description of the construction and operation of the same, reference being had to the annexed drawings, making a part of this specification, and to the letters and figures of reference marked thereon.

Figure 1:
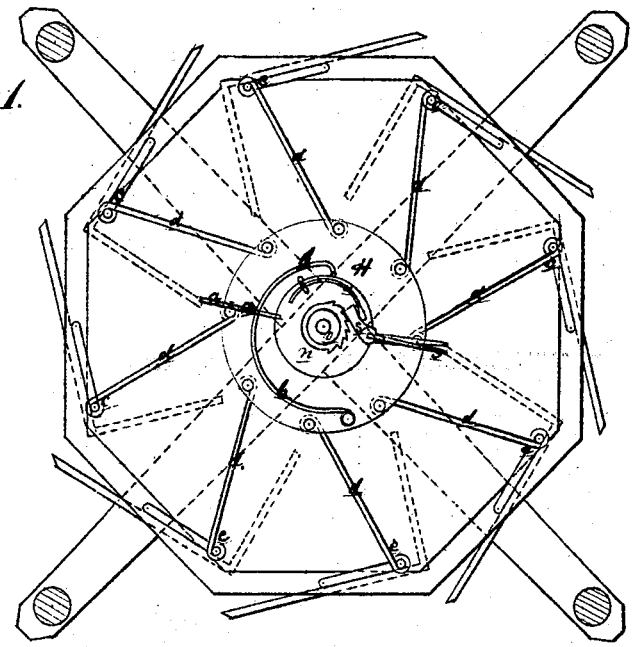
Figure 2:
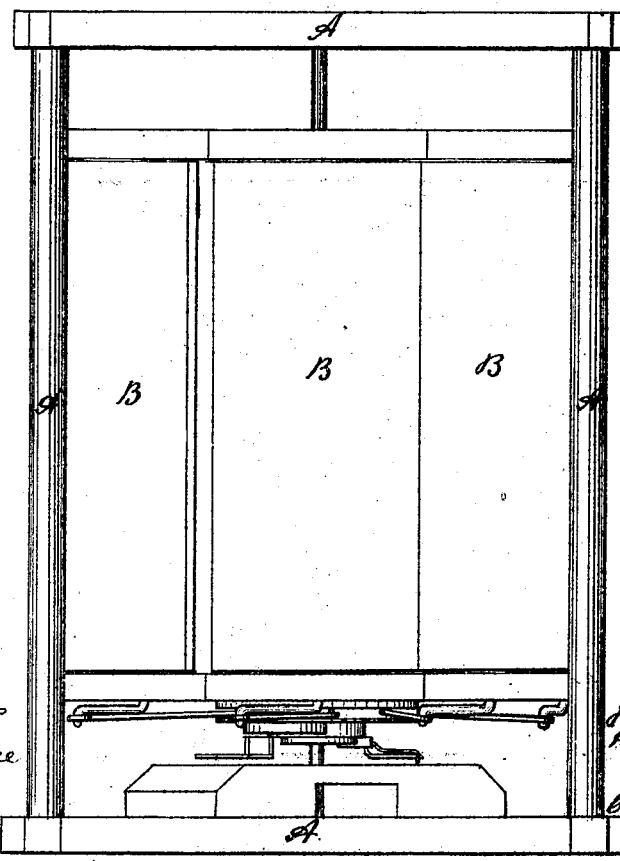

Figure 1 of the drawings is a plan view of our invention. Fig. 2 is a bottom plan view of the same.

Our invention has relation to means for utilizing wind as a motive power; and it consists mainly in a novel arrangement of devices by which the wings of a perpendicular windmill may be opened, closed, or adjusted in any desirable position, at will.

The letter A of the drawings represents a frame in which our invention is adjusted, as hereinafter mentioned.

When the wings of our mill are closed it resembles a hollow, oblong body, having octagon sides and closed ends, which ends are pivoted in the frame of the mill, as shown on Fig. 2.

The letters B represent the wings of our mill, each of which is pivoted at its longitudinal center both at the top and bottom of the mill.

The bottom pivots, by which the wings are attached to the mill, are represented on the drawings by the letters c. They respectively pass through the bottom, and below the same are bent to assume the form and functions of cranks.

The letters d represent arms attached at one end to the crank e, and at the other to the bolts that pass through the sides of rotating wheel H, next mentioned.

The rotating wheel H is arranged around the lower end of the main pivot of the mill, and is operated as hereinafter described.

The letter n is a rotating wheel, arranged to operate around the lower end of the main shaft or pivot of the mill, immediately below the wheel H.

The letter o is a ratchet, firmly affixed to the lower end of the main shaft, and is arranged to operate in conjunction with the pawl-handle and spring, next mentioned.

The letter s is a pawl pivoted to the wheel n, as shown, and working with the ratchet o.

The letter u is a small spring affixed to wheel n, as shown, and arranged to operate with the pawl s.

The letter y is a rest or support for the handle of pawl s. Letter a is a handle for actuating wheel n; and letter b is a spring attached at one end to the lower side of wheel H, and at the other to the periphery of wheel n, as represented.

This arrangement of ratchet, pawl, wheels, handle, springs, arms, and cranks enables the operator to open or close the wings of our mill at will, and also to adjust them to receive the wind in such position as he may deem desirable, the main object being to regulate and adapt their position to the force of the wind.

What we claim as our invention, and desire to secure by Letters Patent, is—

The combination and arrangement of the crank c, arms d, wheels H and n, ratchet o, pawl s, handle a, and springs u and b, substantially as and for the purposes specified.

In testimony that we claim the above we have hereunto subscribed our names in the presence of two witnesses.

JAMES M. HILL.
HENRY C. HILL.

Witnesses:
  W. J. SAILOR,
  G. J. GEORGE.